(12) United States Patent
Hug et al.

(10) Patent No.: US 8,488,110 B2
(45) Date of Patent: Jul. 16, 2013

(54) MEASUREMENT OF DISTANCES OR OF DISTANCE CHANGES

(75) Inventors: Gottfried Hug, Waldkirch (DE);
Reinhard Heizmann, Glottertal (DE)

(73) Assignee: Sick AG, Waldkirch (DE)

( * ) Notice: Subject to any disclaimer, the term of this patent is extended or adjusted under 35 U.S.C. 154(b) by 414 days.

(21) Appl. No.: 12/891,835

(22) Filed: Sep. 28, 2010

(65) Prior Publication Data
US 2011/0098970 A1    Apr. 28, 2011

(30) Foreign Application Priority Data

Oct. 22, 2009   (EP) .................................... 09173841

(51) Int. Cl.
*G01C 3/08*   (2006.01)

(52) U.S. Cl.
USPC .......... 356/5.01; 382/100; 382/168; 702/158; 702/159; 702/180

(58) Field of Classification Search
USPC .................. 382/100, 168; 356/5.01; 702/158, 702/159, 180
See application file for complete search history.

(56) References Cited

U.S. PATENT DOCUMENTS

| | | | | |
|---|---|---|---|---|
| 5,392,043 A * | 2/1995 | Ribner | .......................... | 341/143 |
| 5,583,887 A * | 12/1996 | Murata et al. | ................. | 375/229 |
| 6,122,602 A * | 9/2000 | Michalski et al. | ............ | 702/159 |
| 6,130,724 A * | 10/2000 | Hwang | ......................... | 348/678 |
| 6,801,564 B2 * | 10/2004 | Rouphael et al. | ............. | 375/142 |
| 7,486,589 B2 * | 2/2009 | Lee et al. | ........................ | 367/35 |
| 7,587,017 B2 * | 9/2009 | Smith et al. | .................... | 375/356 |
| 7,915,970 B1 * | 3/2011 | Beylor et al. | .................. | 332/103 |
| 8,024,458 B1 * | 9/2011 | Buragohain | .................. | 709/224 |
| 2004/0001193 A1 * | 1/2004 | Takaoka | ....................... | 356/3.03 |
| 2008/0317166 A1 * | 12/2008 | Flake et al. | ..................... | 375/296 |
| 2009/0254260 A1 * | 10/2009 | Nix et al. | ......................... | 701/96 |
| 2010/0128168 A1 * | 5/2010 | Zhen et al. | .................. | 348/420.1 |
| 2010/0128248 A1 * | 5/2010 | Heizmann et al. | ........... | 356/5.01 |

FOREIGN PATENT DOCUMENTS

| | | |
|---|---|---|
| DE | 101 53 742 A1 | 5/2003 |
| DE | 10 2007 035 691 A1 | 5/2008 |
| DE | 10 2007 013 714 A1 | 10/2008 |
| EP | 2 088 453 A1 | 8/2009 |
| WO | 2004/036155 A1 | 4/2004 |

OTHER PUBLICATIONS

European Search Report; issued Oct. 4, 2010.
Search Report of the European Patent Office; received Apr. 13, 2010.

* cited by examiner

*Primary Examiner* — Isam Alsomiri
*Assistant Examiner* — Samantha K Abraham
(74) *Attorney, Agent, or Firm* — Nath, Goldberg & Meyer; Jerald L. Meyer; Scott L. Langford

(57) ABSTRACT

A sensor for the measurement of distances has a transmitter to transmit a signal at presettable transmission times and a receiver for the reception of the signal remitted in a monitored zone, wherein the received signals are accumulated in a histogram over a plurality of measurement periods to determine the reception time from the histogram and thus the signal transit time. The reception time is determined by an interpolation and thus with a better time resolution than that of the histogram. To facilitate the interpolation, transmission times are preset over the plurality of measurement periods in accordance with a distribution such that the time position of the reception time varies within the histogram over the plurality of measurement periods.

15 Claims, 6 Drawing Sheets

MEASUREMENT OF DISTANCES OR OF DISTANCE CHANGES

Figure 1:
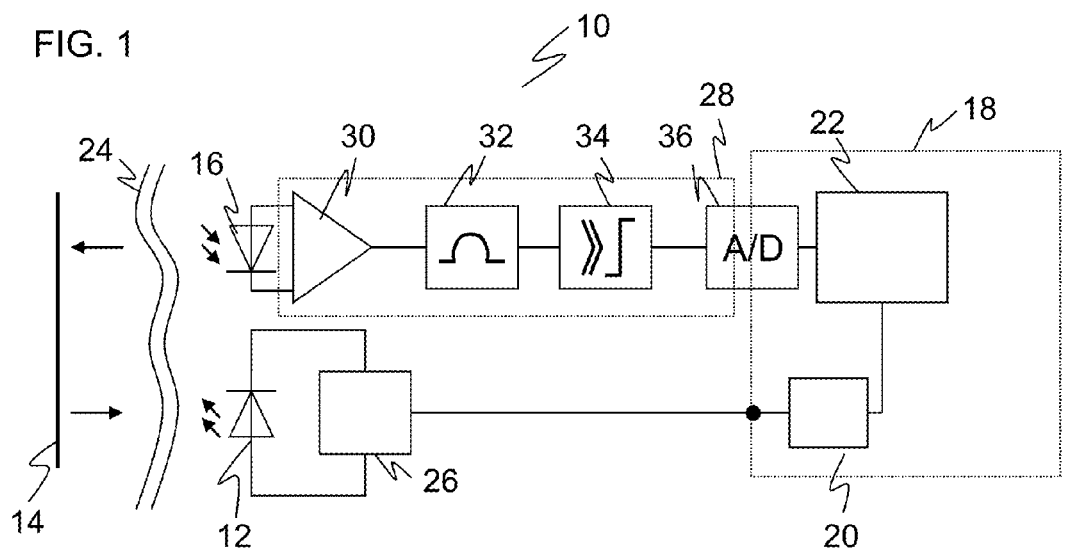

The invention relates to a sensor and to a method for the measurement of distances or distance changes in accordance with the signal transit time principle in accordance with the preamble of claim 1 and claim 12 respectively.

A large number of sensors use a signal transit time principle in which the time interval between the transmission and the reception of a signal is converted into a distance via the signal transit time. In this respect, different frequency ranges of the electromagnetic spectrum such as microwaves and light are thus utilized.

In optoelectronic sensors in accordance with the principle of the time of flight of light, a short light pulse is transmitted in a pulse transit time process and the time up to the reception of a remission or reflection of the light pulse is measured. Alternatively, in a phase process, transmitted light is amplitude modulated and a phase shift between the transmitted light and the received light is determined, with the phase shift likewise being a measure for the time off flight of light. Due to eye protection regulations, the last named phase modulation processes are in particular less suitable with low-remitting targets due to the required large integration times. In the pulse process, the integrated power can be profitably used such that short pulses can be transmitted at a high energy density and the signal-to-noise-ratio can thus be improved for the single shot.

Optoelectronic distance measurement can be required, for example, in vehicle safety, in logistics automation or factory automation or in safety engineering. A distance measurement device based on a reflected light beam can in particular respond to a distance change of the reflector or of the reflecting or remitting target. A special use is a reflection light barrier in which the distance between the light transmitter and the reflector is monitored. The time of flight of light process is also the principle according to which distance-measuring laser scanners work whose position vector measures a line or even an area.

Filling level measurement is an area of application for microwaves. In this respect, the signal transit time up to the reflection at a boundary surface of the medium whose filling level is to be measured is determines. In this respect, the radiated microwaves are guided in a probe (TDR, time domain reflectometry) or, alternatively, are freely radiated as in radar and are reflected by the boundary surface.

If the resolution of the distance measurement should reach an accuracy in the range of a few tens of millimeters, the signal transit time must be determined exactly in an order of magnitude of hundreds of picoseconds. To achieve a distance resolution of a millimeter, six picoseconds have to be covered meteorologically. Such a precision can only be realized with very cost-intensive electronics with conventional systems. Less expensive components such as FPGAs (field programmable gate arrays) and other programmable digital logic modules typically have operating frequencies in the range of some hundred MHz. Nanoseconds, but not picoseconds can thus be resolved.

It is therefore necessary for high time precision to achieve accuracies below these working frequencies. Since it is a question of the relative position, not of the absolute position, between the transmission time and the sampling of the received signal for a signal transit time measurement, higher resolution can be achieved by shifting the transmission time or the reception time.

Another difficulty is the signal-to-nose ratio. The energy of an individual reflected signal pulse is typically not sufficient by a large amount, except for very short distances and highly reflective targets, to be distinct from the background noise in a manner which can be determined significantly and reliably. In distance-measuring laser scanners, for example, this problem is solved in that very strong pulses are transmitted. For this purpose, however, cost-driving high-performance lasers having at least a plurality of watts output power and avalanche diodes are required.

It is therefore proposed in DE 10 2007 013 714 A1 to collect a plurality of individual measurements in a histogram and to evaluate them together. However, since the lateral resolution of the histogram is limited, to increase the measurement precision, the measurement window is displaced to a specific transition point in accordance with DE 10 2007 013 714 A1 after evaluation of a plurality of histograms by selection of a specific transmission delay. This process is time-intensive and results in a slow measurement frequency. It is furthermore known from DE 10 2007 013 714 A1 to transmit light pulses with delays which have deviations about the defined delay and only correspond to the defined delay in the mean. However, this does not increase the measurement precision, but rather only serves to compensate imprecision in the delay circuit, i.e. to improve the time association of measurement events into the histogram overall.

An improvement in the resolution by modules with higher sampling rates is admittedly conceivable. However, since a distance resolution for 150 mm corresponds to a time resolution of 1 ns, no less expensive modules will be available, at least in the foreseeable future, which provide the time demands for a millimeter resolution.

It is therefore the object of the invention to provide a distance measurement having improved measurement speed and measurement precision.

This object is satisfied by a sensor in accordance with claim 1 and by a method in accordance with claim 12 for the measurement of distances or distance changes. In this respect, the solution starts from the basic idea of collecting the measurement information from the received signal of a plurality of individual signals in a histogram, that is to count the events (counts) which fall within a respective time region (bin). A distance value is determined from the histogram itself without inclusion of the results from earlier measurements. To increase the time precision, the measurement information is interpolated in the histogram. When the histogram is saturated, however, an interpolation does not produce hardly any gain, because, for example, the number of counts jumps from a maximum to a minimum from one bin to the next. The measurement precision is then restricted to the relatively small time resolution of the histogram which is given by the bin width and which in turn at best corresponds to a sampling period. Provision is therefore made in accordance with the invention to spread the flank in the histogram about the reception time so that it is spread over a larger number of bins. This is achieved in that the individual signals are transmitted with a time distribution so that the reception time directly comes to lie in different bins of the histogram. The flank spread in this manner creates the condition to be able to achieve the desired improvement in the measurement precision, that is to achieve a subsample resolution, by means of interpolation.

The invention has the advantage that a highly precise distance determination is made possible with a high measurement frequency. At the same time, cost-driving elements such as high-performance lasers or avalanche photodiodes can be dispensed with. Distances can even be reliably measured at a signal-to-noise ratio less than one due to the statistical evaluation.

The reception time is varied, for example, in that the transmission times are varied in accordance with the distribution with respect to any desired, but defined reference point such as the start of a measurement period. The contribution to the histogram belonging to the reception time is then in different bins due to the distribution of the transmission times. The time range of interest around the reception time for the interpolation is thereby spread in time.

The distribution is preferably shallow or Gaussian. The distribution indicates how often an individual signal should be transmitted with a specific transmission time delay for the determination of a histogram. It is, for example, stored as a table whose entries for discrete steps from a minimal delay up to a maximum delay indicate the occurrence of the associated signals. The discrete steps are advantageously smaller than the sampling period since the achievable resolution improvement is linked to this step size and the transmission times are also not tied to the sampling rate of the received signal. With a shallow distribution, all table entries are one or are at least constant. A Gaussian distribution accordingly discretely replicates a Gaussian curve. Distributions can quasi be stacked by multiple use to increase the statistics. This is equivalent to scaling up the table entries using a factor.

The breadth of the distribution in this respect preferably amounts to a multiple of the time resolution of the histogram. In particular double to five times the resolution of the histogram can be considered as the multiple. The decisive environment of the reception time in the histogram thus includes two to five bins, or even more bins, which are included in the interpolation. The breadth of the distribution is understood as the time difference between the smallest and the largest transmission time delay used. A discrete Gaussian distribution also has a fixed breadth in this sense.

The interpolation preferably takes place with reference to a function fit with an expected signal development in the environment of the reception time, in particular by linear regression analysis. The curve in the histogram in the vicinity of the reception time is known in advance. On the use of a shallow distribution and with strong levels of the received signal, the curve is approximately linear so that a linear regression is sufficient which can be calculated with a comparatively low effort. In other cases, in particular with weak levels and correspondingly dominant noise or on the use of a non-shallow distribution, a different functional curve arises, frequently following a Gaussian distribution. It is then possible first to linearize the curve, for example using a value table of the deviations of the expected function and subsequently again to carry out a linear regression analysis. Alternatively, a different function fit process is used.

The evaluation unit is preferably implemented on a digital logic module, with an analog preprocessor being provided via which the received signal can be converted to a bipolar preprocessed signal and can be supplied to the evaluation unit via an A/D converter, with the preprocessor in particular having a bandpass filter or a differentiator for the conversion of the initially unipolar received signal into a bipolar signal. The preprocessor thus generates transitions in the received signal in a reliable, reproducible manner at which the reception time can be determined particularly simply and precisely. The distribution of the transmission times for the spreading and for the filter frequency are to be matched to one another. If spreading is carried out too much, signal portions of different signs of the bipolar signal eliminate one another in the histogram, while too low a spread makes the interpolation more difficult.

The sampling preferably takes place by means of a binarizer as an A/D converter so that the received signal is present as a bit sequence of zeros and ones and thus delivers binary counts for the histogram. This reduces the evaluation effort. The spread arising due to the distribution is particularly useful with such binary counts since particularly steep curves can arise in the histogram without spreading.

The evaluation unit is preferably made to recognize the reception time with reference to a zero crossing, an extreme or a point of inflection of a function interpolating the histogram. The time position of such characteristics, particularly of zero crossings, can be determined particularly precisely.

The evaluation unit is advantageously made to determine a plurality of reception times of part reflections and thus the distances of a plurality of objects disposed in the same direction. With optoelectronic sensors, reflections also arise at partly transparent objects, for example at glass panes, rain drops or the like, so that both these objects and opaque objects behind them can be recognized in the received signal. The situation is similar with filling level applications having a plurality of boundary surfaces, for example multilayer liquids such as oil on water. Since the position is determined from a plurality of these reflections, the sensor recognizes a plurality of the objects or all the objects in the transmission direction.

In a preferred further development, an analog/digital converter for the sampling of the received signal to increase the sampling rate works with a plurality of clock pulse edges and/or phases, in particular for doubling with the rising and the falling clock pulse edges or with a clock pulse phase-shifted by 0° and with a clock pulse shifted by 180° respectively or for quadrupling with the rising and falling clock pulse edge of a respective pulse edge phase shifted by 0° and 90! or with a respective clock pulse edge phase shifted by 0°, 90°, 180° and 270° in each case. The limited resolution of the sampling is thus refined.

The distribution is in this respect preferably selected so that each histogram value is determined equally frequently under each phase shift, with the evaluation unit being made to bring the histogram values thus determined a multiple of times into time coincidence while compensating the phase shift. The sampling under a plurality of phases introduces time imprecision ("jitter") since the desired phases are only achieved with an error. If each histogram value is determined once under each respective phase, these errors are at least partly averaged out.

The evaluation unit is preferably made only to use an environment of the reception time of the histogram as the basis for the interpolation, in particular only two, four or eight values of the histogram. The effort of the interpolation, in particular of the regression analysis, is thus limited. The number of values is again preferably matched to the number of phases which are used in the sampling. A number of values of the histogram are in particular used as the basis for the interpolation which correspond to one times or to a multiple of the factor by which the sampling rate is increased by the plurality of phases. If, for example, four phases are used and the regression is calculated adapted thereto with four values, any jitter makes a contribution in the same manner at each measurement point and is thus averaged out or can at least be eliminated by initial teaching-in, provided that a center of focus shift remains which is then, however, reproducible.

The evaluation unit is preferably made to locate the environment in that the histogram is folded with a correlation filter core, with the correlation filter core replicating the expected histogram development about the reception time. The unfiltered development about the reception time in the histogram in particular can hardly be distinguished from the noise level with very noisy received signals. The correlation filter core simplifies the location of the measured values decisive for the interpolation. The correlation filter core, the frequency of the band pass filter and the distribution of the transmission times are to be matched to one another. The correlation filter core is preferably constructed so that it gives a positive evaluation to measured values lying to the left of the measured point respectively under consideration and a negative evaluation to those lying to the right. It thus replicates the expected zero crossing from positive to negative. The information content of the histogram corresponds to pure noise in the direct environment of the reception time which corresponds as the zero crossing to the measured value zero. Weights of zero are therefore preferably used in this direct environment in the correlation filter core. The use of +1, 0, −1 as weights of the filter is sufficient to carry out the folding with the filter core with very low calculation costs without multiplications.

The sensor is advantageously made as an optoelectronic sensor, in particular as a light sensor or as a sensing light grid, with the electromagnetic signal being light, the sensor being a light sensor and the receiver being a light receiver. In a sensing light grid, a plurality of distance-measuring light sensors are arranged as parallel sensing beams. In this respect, in contrast to a classical light grid, only a single transmitter/receiver stick is required; the conventionally used counter-piece with reflectors or receivers can be omitted. The inexpensive construction of the measurement core in accordance with the invention makes it possible also to generate a plurality of beams for a sensing light grid in an inexpensive manner.

The sensor is particularly preferably made as a distance-measuring laser scanner which has a rotatable deflection unit to deflect the transmitted signal periodically via a sampling region. Conventional distance measurements with a statistical approach are too slow for the scan movements. The solution in accordance with the invention with its precise direct measurement from only one histogram also satisfies the speed demands of a laser scanner.

As an application outside optoelectronics, the sensor is advantageously made as a filling level sensor in accordance with the radar principle or the TDR principle, with the electromagnetic signal being a microwave signal, the transmitter being a microwave transmitter and the receiver being a microwave receiver. Such sensors can be manufactured in accordance with the invention with resolutions in the millimeter range.

The method in accordance with the invention can be designed in a similar manner by further features and shows similar advantages. Such further features are described in an exemplary, but not exclusive manner in the dependent claims subordinate to the independent claims.

Figure 2:
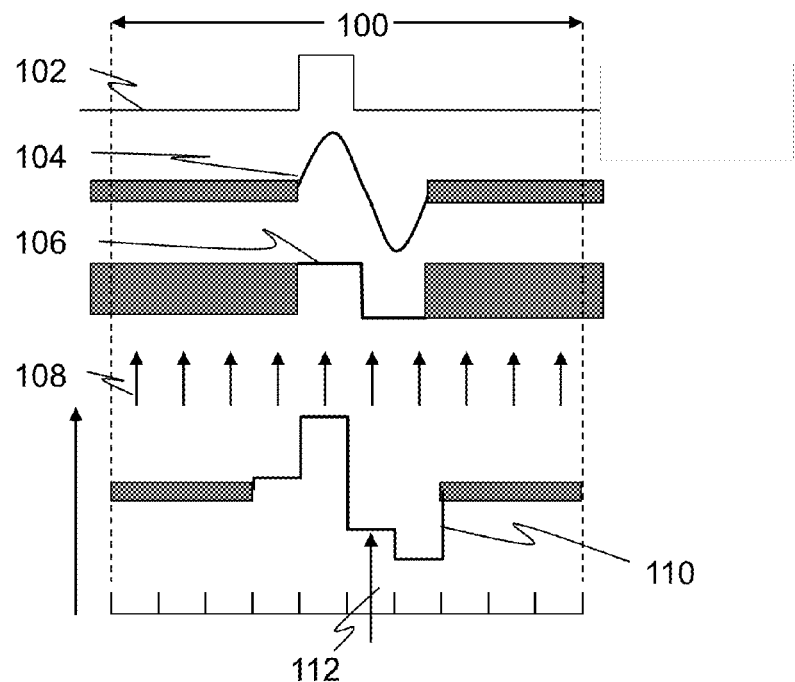
Figure 3A:
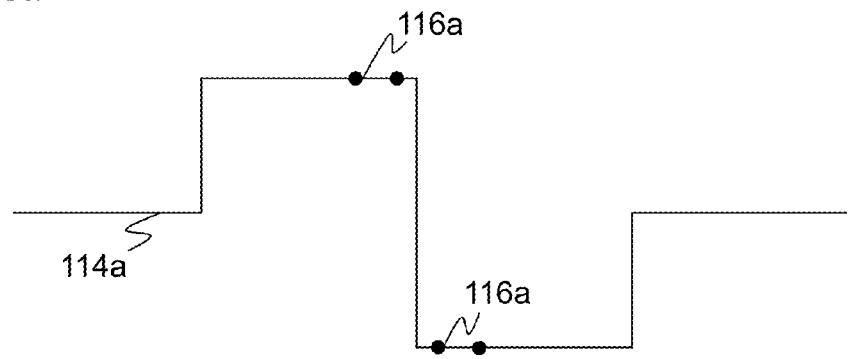
Figure 3B:
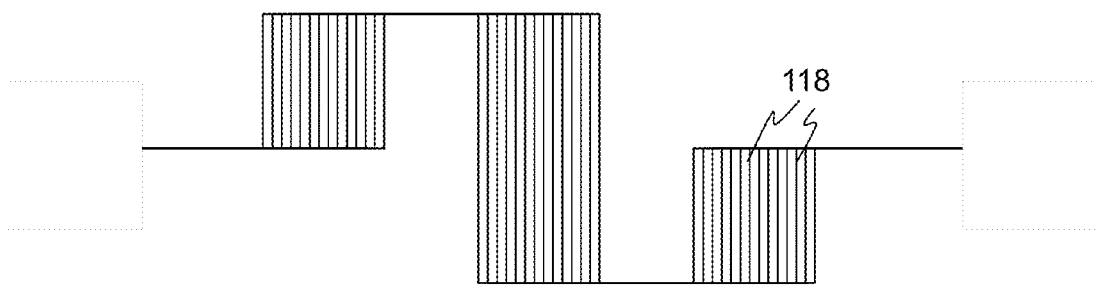
Figure 3C:
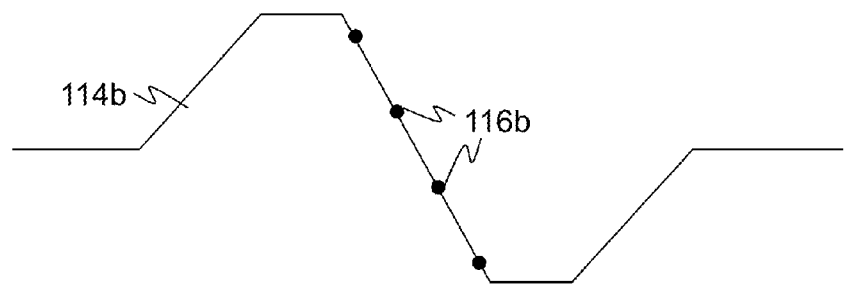
Figure 4:
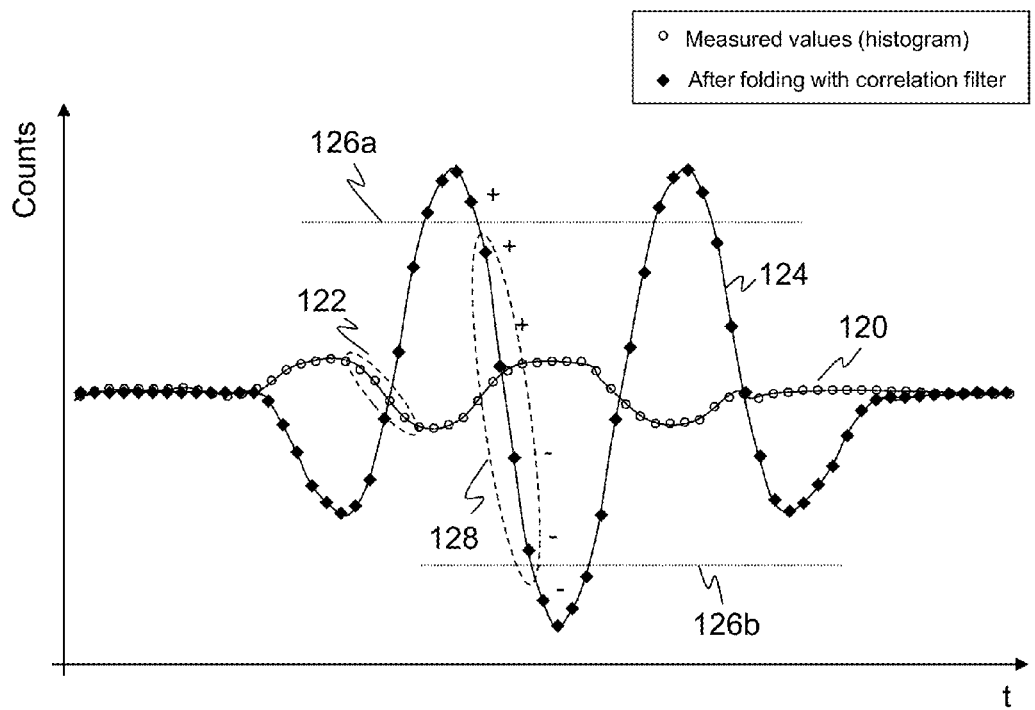
Figure 5:
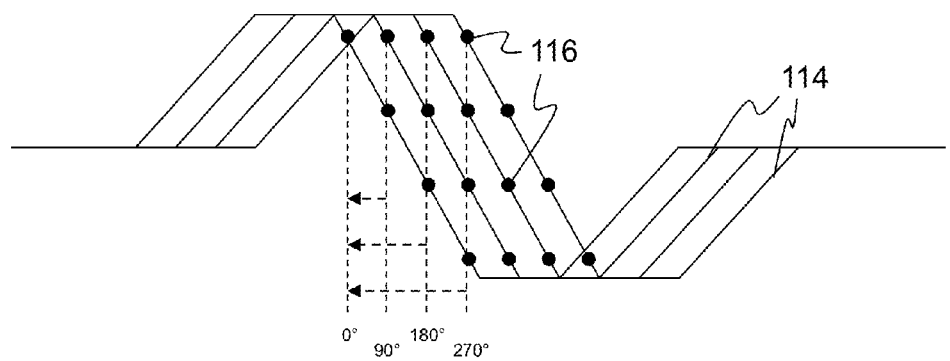
Figure 6:
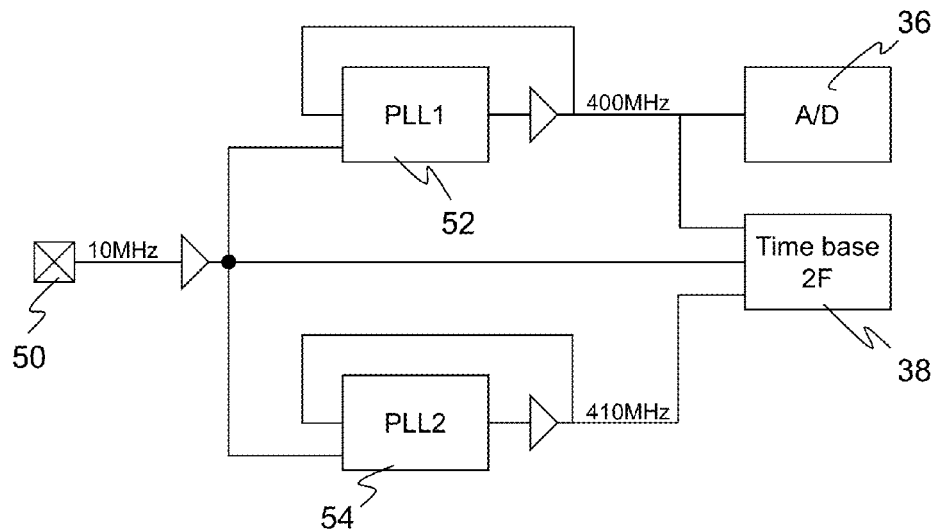
Figure 7:
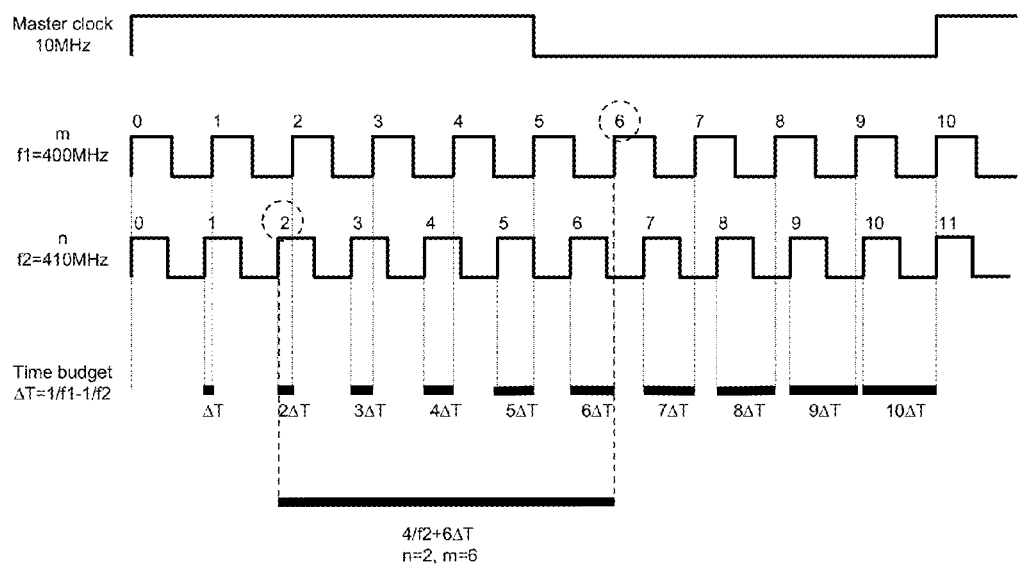
Figure 8:
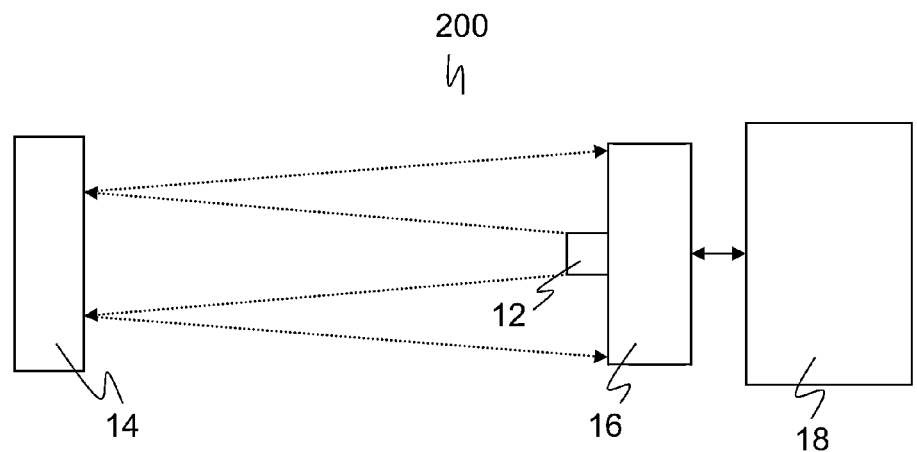
Figure 9:
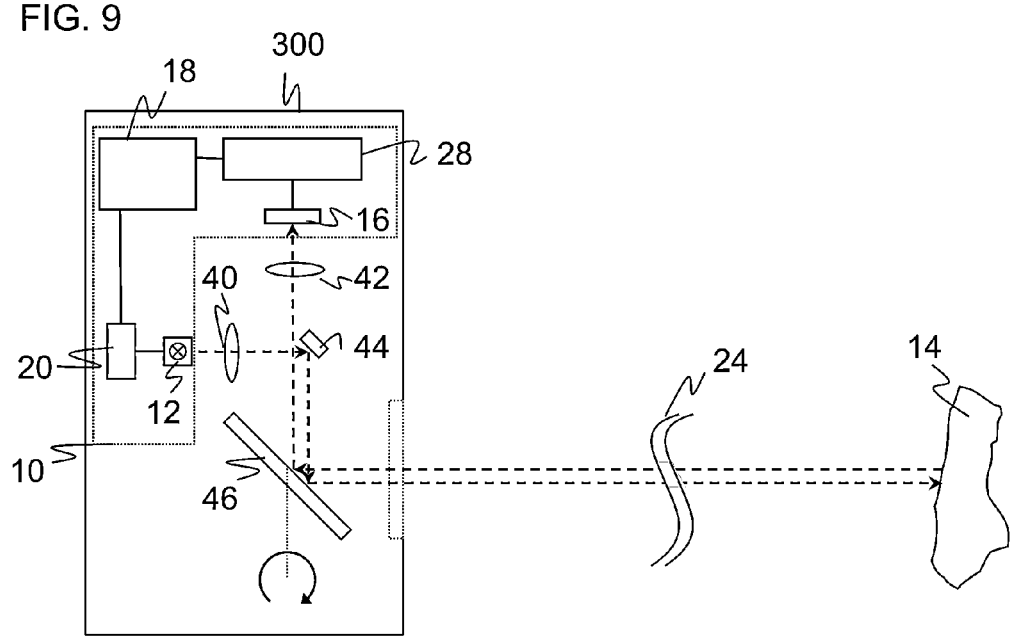
Figure 10:
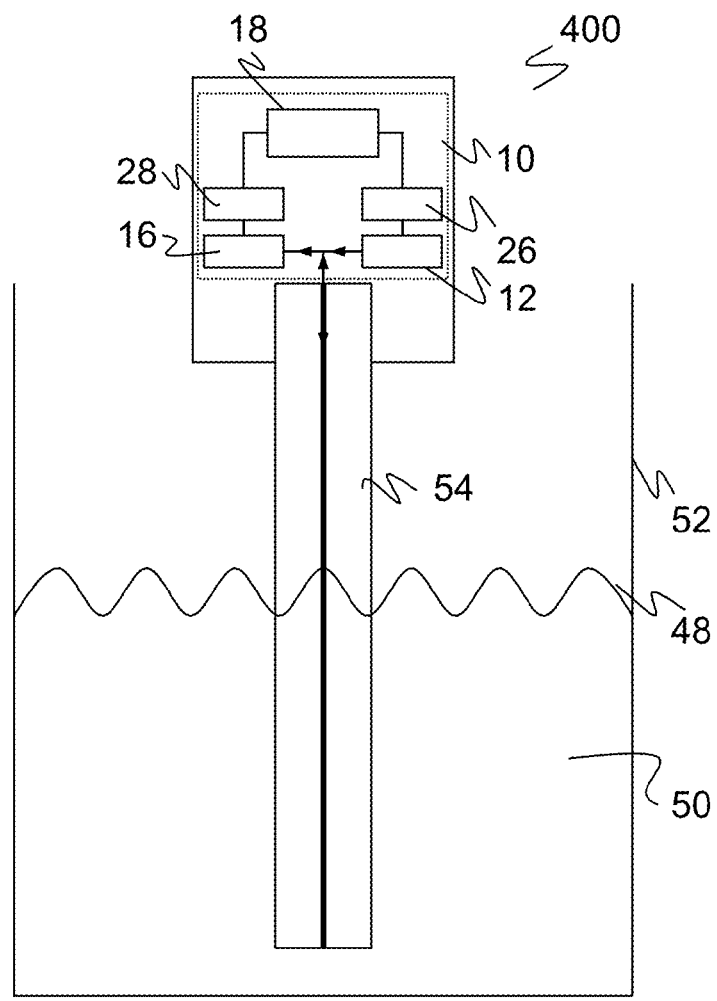

The invention will also be explained in the following with respect to further advantages and features with reference to the enclosed drawing with reference to embodiments. The Figures of the drawing show in:

FIG. 1 a block diagram of the measurement core for the signal processing of a sensor in accordance with the invention;

FIG. 2 a schematic representation of the signals in different processing stages for the explanation of the evaluation process;

FIGS. 3a-c schematic signal curves for the explanation of the signal spreading for the interpolation of the reception time with higher time resolution;

FIG. 4 a schematic histogram and its curve after processing with a correlation filter core;

FIG. 5 schematic signal curves for the explanation of the increase in the sampling rate through a plurality of phasings and its folding for the elimination of jitter;

FIG. 6 a block diagram for the generation of a high-resolution time base;

FIG. 7 schematic signal curves for the explanation of the generation of the time base;

FIG. 8 a schematic block illustration of a distance-measuring light sensor having a measurement core in accordance with the invention;

FIG. 9 a schematic block illustration of a distance-measuring laser scanner having a measurement core in accordance with the invention; and FIG. 10 a schematic block illustration of a filling level sensor having a measurement core in accordance with the invention.

FIG. 1 shows a block diagram of a measurement core 10 in accordance with the invention for the determination of a distance in accordance with a signal transit time principle. Examples for sensors in which the measurement core 10 is used are subsequently listed in connection with FIGS. 8-10. An electromagnetic signal, for instance a light pulse or a microwave pulse, is transmitted via a sensor 12 and is reflected back by an object 14 which can also be a reflector or a boundary surface of two media. The reflected signal is registered in a receiver 16 and is converted into an electrical received signal.

The transmitter 12 and the receiver 16 are controlled and evaluated by a controller 18. The controller 18 causes the transmitter 12 to transmit individual pulses at a known time and determines the reception time of the reflected pulse in the receiver 16. The signal transit time is calculated from the reception time with the known transmission time and in turn corresponds to the distance of the target object 14 via the signal speed, in most applications the vacuum light speed.

The controller is implemented in the described embodiment in accordance with the invention on an FPGA (field programmable gate array) 18. Alternative digital modules are microprocessors, PLDs (programmable logic devices), ASICs (application-specific integrated circuits) or DSPs (digital signal processors). The controller 18 has a transmission time setting device 20 and an actual evaluation unit 22. The target object 14 is usually further away in the scale of FIG. 2, as is indicated by dashed lines 24.

The measurement core 10 has a transmission path to which, in addition to the actual sensor 12, a driver circuit 26 and the delay device 20 belongs, and a reception path to which the receiver 16 belongs which supplies the digitized received signal to the evaluation unit 22 via an analog preprocessor 28.

The analog preprocessor 28 forms a multi-stage processing path. This starts with an amplifier 30, for instance a transimpedance amplifier, which accepts and amplifies the signal of the receiver 16. A downstream filter 32, which can be a band pass filter or a differentiator, for example, converts the unipolar signal of the pulse into a bipolar signal. The amplifier 30 and the filter 32 can also be connected in reverse order. A limiting amplifier 34 is provided as the next preprocessing stage which amplifies the amplitude so much and subsequently cuts it so that the pulse signal becomes a rectangular pulse driven into saturation. This signal is supplied to an A/D converter 36 as the last preprocessing stage, in particular to a binarizer, which does not convert the amplitude into a digital numeric value, but only into a binary value. The A/D converter 36 is preferably not a separate module, but is rather realized via the inputs of the FPGA 18 with simple, interposed analog R networks or RC networks.

The signal and evaluation path in the measurement core 10 through the components just described will now be described with the help of FIG. 2. In this respect, a statistical evaluation of a plurality of individual measurements is provided because the signals of the individual measurement have much too much noise to be able to determine reliable reception times.

The sensor 12 generates a respective pulse in each measurement period which enables the determination of a precise time. A rectangular pulse is suitable as the signal shape, but other pulses, such as Gaussian pulses, multimodal signals, for encoded association of each signal, for example, and also stages are conceivable. All these signal shapes will only be called a pulse in the following.

The pulse is reflected at the target object 14 and is amplified into an electric signal in the amplifier 30 after conversion in the receiver 16. The arising electrical signal 102 is shown in idealized form; under realistic conditions, the received pulse 102 would not be a precise rectangle, but would show transients at the flanks and noise overall.

The unipolar received pulse 102 is converted to a bipolar signal 104 in the filter 32. It can be realized with a band pass filter of a suitable filter frequency. Gray rectangles are shown next to the bipolar signal 104 and are intended to symbolize the noise level. The noise level can exceed the amplitude of the amplified signal 102 in practice. Furthermore, only a sine oscillation of the bipolar signal 104 is shown. Post-oscillations, that is further sinus periods with increasingly damped amplitude, are omitted for a simplified representation. A pure sine is naturally also not always to be expected, but a curve with a maximum and a minimum.

The bipolar signal 104 is amplified so much and is cut-off in the limiting amplifier 34 such that the actual signal becomes a rectangle flank 106 and the noise level shown by gray rectangles is extended over the total dynamic range in its amplitude.

The rectangle flank 106 is sampled with a sampling rate of, for example, 2.5 ns in the binarizer 36. This sampling rate is symbolized by arrows 108 in FIG. 2. The bit sequence which arises, 1 bit per 2.5 ns with the numerical values given, is used in the evaluation unit 22 to form a histogram 110. For this purpose, an accumulator is provided for each bin of a width corresponding to the sampling rate 2.5 ns and is only counted up at an associated bit value "1".

With ideal signals without noise, only that bin would be filled in this histogram 110 which is disposed above the right hand flank 106. The noise level raised by the limiting amplifier 34, however, also fills the remaining bins, and indeed approximately in every second measurement period 100 due to the randomness of the noise in the expected value.

If the process just described is iterated and if the histogram 108 is formed over k measurement periods 100, the bins are filled approximately with the value k/2 by the noise, with statistical fluctuations also occurring. This value k/2 corresponds to the signal value zero due to the binarization. The maximum formed by the positive part of the bipolar signal 104 rises upwardly from this and the corresponding minimum downwardly. Together with the post-oscillations, not shown, the histogram shows a characteristic curve in the time interval of the received signal whose signature is used by the evaluation unit 22 to determine the reception time. The statistical evaluation of a plurality of individual measurements also allows this when the individual measurement does not permit any reliable distance determination in a measurement period 100 due to noise portions which are too high.

The reception time can best be determined with reference to the first zero crossing from maximum to minimum. In the Figure, this zero crossing lies in the bin labeled with an arrow 12. The time precision of this information is limited to the resolution of the histogram 110, that is, for example, to 2.5 ns, and is thus directly coupled to the sampling rate of the A/D converter 36.

Provision is made in accordance with the invention to improve the time precision by interpolation. FIG. 3a shows by way of example a histogram 114a having the four sampling points 116 adjacent to the zero crossing. These sampling points 116 correspond to the histogram bars of the histogram 110 of FIG. 2. The histogram 114a is shown in simplified form with straight lines without noise influence. This situation corresponds to high levels with saturation effects, that is highly reflective objects 14 and/or short distances. At weak levels, a Gaussian curve of the flanks can instead be expected due to the noise influence.

The flank in the histogram 114a practically falls instantaneously due to the discretization. An interpolation on the basis of the sampling points 116 therefore results in no improvement with respect to the resolution of the histogram 114a.

Provision is therefore made in accordance with the invention to spread this flank in time to make is accessible to an interpolation. The transmission behavior is modified for this purpose. Instead of transmitting the transmission pulse at the same time with respect to the start of the measurement period in the recording of the histogram with each repetition, this time is varied in the repetitions.

FIG. 3b schematically shows the superimposition of the transmitted pulses 118 distributed in this manner. In this respect, by way of example, in fourteen repetitions just as many transmission pulses 118 are generated at an equidistant spacing. This is labeled a shallow distribution within the framework of this description because the frequency of the use of the respective transmission delays is constant.

As can be recognized in FIG. 3c, the distribution of the transmission delays ensures that the previously perpendicular flank in the histogram 114b is slanted. The sampling times 116b lie on a falling straight line and are thus accessible to a linear regression analysis. The resolution of the measurement is thus independent of the resolution of the histogram 114 and is thus improved by orders of magnitude.

The distribution of the transmission time delays is advantageously selected so that particularly the number of sampling points 116 required for the regression no longer lies in the saturation range, that is forms the spread flank. In the example shown, there are four sampling points 116b. A regression can alternatively be calculated using more sampling points 116 and with less sampling points. If, for example, the sampling rate is 400 MHz, the flank should comprise 4*2.5 ns=10 ns in total. This can be achieved by the shown fourteen transmission delays if they are displaced by 10/14 ns with respect to one another.

The number of fourteen transmission delays is purely an example figure; in practice, more and finer transmission delays will usually be necessary. Measurement information should namely not only be obtained discretely for the interpolation at the times given by the transmission delays, but also in the intermediate intervals. This can be achieved if noise terms smear the information gained in the time range with reference to discretely controlled times of transmission where possible up to a continuum. At weak levels, such noise terms are usually anyway present. At saturated levels, for example, the precision of the time resolution with which the time delays can be preset can introduce the required noise terms. The intervals between the individual transmission pulses 118 should in each case be in the order of magnitude of the time width of the noise terms given, for example, via the standard deviations to achieve the desired continuum.

Even finer resolutions are possible with other sampling rates and additional transmission time delays. It must be noted in this respect that the transmission time delays are not bound to the sampling pattern. They can, in contrast, be selected more finely, for example by DDS (direct digital synthesis) or by decoupling from two mutually out of tune frequencies such as will be explained in more detail below in connection with the FIGS. 6 and 7.

Other distributions are also conceivable instead of a shallow distribution as shown in FIG. 3b. A Gaussian distribution is particularly suitable for this purpose. Weaker levels also bring about a similar effect to a Gaussian distribution since then the flank no longer drops as steeply as in FIG. 3a, but is rather distorted in Gaussian manner by the noise. The flank must then be linearized before a linear regression in that the deviations which arise due to the Gaussian curve are corrected in advance. For this purpose, these deviations are stored in a table for the simplification of the calculation. In practice, the effort for a linearization is too high with an inverse Gaussian function in some applications with respect to the improvement achieved so that the shallow distribution is preferred.

The requirement for the interpolation described with reference to FIG. 3 is to identify the sampling points 116 to be used for the interpolation. For this purpose, the zero crossing used as the characteristic from the first maximum to the first minimum has to be found in the histogram 114. The measurement core 10 in this respect does not use any information on the objects 14 recognized historically to be able to make fast and dynamic measurements, but rather takes all the information relevant to the measured values from an individual histogram 114.

FIG. 4 shows the exemplary curve of a measured histogram 120 with all post-oscillations by circular measured points. The sampling points which are marked by a dashed oval 122 are to be identified around the first zero crossing. With a saturated level, a perpendicular drop of the histogram 120 would arise in the region 122. The histogram is accordingly recorded at a weak level or, as was described in advance with reference to FIG. 3, it was spread by the distribution of the transmission times.

A direct search for the signature of the first zero crossing in the histogram 120 would not be sufficiently stable with respect to noise terms and other disturbance effects. The histogram 120 is therefore folded with a correlation filter core. In this respect, the curve path 124 with diamond-shaped measured points arises.

A true correlation would be very calculation intensive and would at least not be able to be realized in quasi real time on an FPGA. A simple filter core is therefore used whose correlation coefficients are matched to the filter frequency of the filter 32 and to the spread by the distribution described in connection with FIG. 3. The environment of the transition is evaluated, with the points in the direct vicinity of the transmission being excepted, because only noise information is to be expected there. A specific example for the filter coefficients is +1, +1, +1, +1, 0, 0, 0, −1, −1, −1, −1. Such a filter core can be processed solely by addition without any calculation-intensive multiplications. The number of repetitions is a concretization of the matching to the distribution and to the number of used interpolation points of the interpolation.

The transitions can be identified in a considerably more robust manner in the curve path 124 due to the correlation filter. The typical signature of the sign change from positive to negative between the first maximum and the first minimum is sought which is recognized by application of an upper threshold 126a and a lower threshold 126b. The points in the oval 128 of the curve path 124 are recognized in accordance with this criterion. It is not absolutely necessary in this respect to identify the same number of points which are later used for the interpolation. It is a question of fixing a time about which the relevant sampling points lie in the oval 122. The time determined by the oval 128 therefore does not yet already match the sampling points sought in the oval 122 because the curve path 124 has a time offset with respect to the histogram 120 which arises due to the system because of the calculation time for the folding. This offset is, however, constant and known and can thus be compensated. The relevant sampling points in the oval 122 are thus also identified.

Additional reflections can also be evaluated using this process which are produced, for example, by glass panes or other objects 14 partly transparent for the signal used.

FIG. 5 shows a process with which the sampling rate of the A/D converter 36 can be increased by a factor. The precision of the interpolation and thus the resolution of the measurement core 10 also improve accordingly. Not only a clock pulse is used for the increased sampling rate but rather a plurality of mutually phase-shifted clock pulse networks. The FPGA 18 of the controller, for example, already provides such phase-shifted clock pulses. On the use of clock pulses mutually shifted by 0°, 90°, 180° and 270°, the sampling rate thus increases by a factor of four. More or fewer phases are conceivable, with a limit being given upwardly by the errors in the phasing which can amount to ±5° and more.

The named errors in the phasing result in an imprecision or a jitter of the sampling. The increase in the measurement precision which could be achieved by an increased sampling and a thus improved interpolation is impaired by the jitter. A folding for the correction of the jitter is therefore provided in accordance with the invention as shown in FIG. 5. Provision is made in this respect that each sampling point is generated a multiple of times equally frequently in each case while using each clock pulse network, that is each phasing. In the example of the used four phasings, the flank to be evaluated by interpolation thus arises fourfold and the flanks are pushed over one another subsequently by compensation of the known phasings. Any possible error term in a phasing thus contributes to each sampling point in the same manner. The error terms are thus averaged out to a large part. A nevertheless remaining shift in focus is constant and affects all sampling points equally so that they can also be compensated simply, for instance by a teach-in process.

Instead of the shifted phasings, or also in addition thereto, both the falling flank and the rising flank of the clock pulse can be used for the sampling to gain a further factor of two in the resolution. If, for example, two clock pulses are used which are phase-shifted by 0° and 90° and then in each case the falling flank and the rising flank, this effectively corresponds to a sampling at 0°, 90°, 180° and 270° and thus to a resolution improvement by the factor of four.

A process will now be explained in more detail with reference to FIGS. 6 and 7 with which the transmission time setting device 20 generates the distribution of the transmission times for the spread with a high resolution, with this resolution also being able to be considerably higher than the sampling rate of the A/D converter 36. Alternatively to the process described, a DDS can be used, with such a module with the required resolution, however, being much more cost intensive.

A split clock is generated from a master clock 50 of 10 MHz as a multiple of the master clock 50 of f1=400 MHz or f2=410 MHz in a first PLL 52 (phase-locked loop) and a second PLL 54. A time base unit 38 receives the two frequencies of the PLLs 52, 54 and the master clock 50 itself for the synchronization. The frequencies are connected in the time base unit 38 so that their phase deviation can be used for the reproducible generation of time increments of the desired resolution which are provided to the transmission time setting device 20. The frequency of 400 MHz of the first PLL 52 can simultaneously serve as a sampling rate for the A/D converter 36.

As can be seen in FIG. 6, the periods of the two different frequencies 400 MHz and 410 MHz increasingly run apart and meet again after a period of the master clock 50 of 100 ns. At this time, a synchronization in each case takes place to the theoretically simultaneously rising or falling flank so that any running apart of the PLLs 52, 54 and of the master clock 50 is compensated. FIG. 6 is simplified and only shows 10 or 11 periods. Even smaller time increments are achieved with higher period numbers which differ from one another by one or which are at least prime to each other for the optimum increase in resolution.

The PLLs 52, 54 are preferably provided by the FPGA 18. The two frequencies can, however, also be generated differently than by means of PLLs. A master frequency deviating from 10 MHz and different frequencies than the exemplary frequencies f1=400 MHz and f2=410 MHz are naturally also covered by the invention, with the choice having to find a balance between the stability of the derived frequency generated and a difference period which is as short as possible. Time patterns in the range of picoseconds and below can be achieved at least in principle by this choice.

The periods of the derived frequencies f1 and f2 are counted through in shift registers triggered by these frequencies so that the time base unit 38 as shown in FIG. 6 knows which period a flank belongs to. An increasing phase difference forms between the respective ith period of f1 and f2 and become just so large after a full period of the master clock 50 that the 11th period of f2 comes to lie simultaneously in time with the 10th period of f1. These differences are available in the form of time increments or time budgets as multiples of the difference period $\Delta T = 1/f1 - 1/f2$.

The time base unit 38 now selects a respective pair from the nth period of the frequency f2 and the mth period of the frequency f1 to generate any desired multiples of the difference period. Each pair has a fixed position relative to the master clock 50. For example, n=2 and m=6 corresponds to a time interval of $4/f2 + 6\Delta T$, where $1/f2 = 41\Delta T$. Full periods of the master clock are in this respect counted in to fill the measurement period 100, for example by a higher-ranking control unit which masks the timing and which is fixed to the master clock. In this respect, the counters are reset with each synchronization so that the numbering of the pairs starts afresh. Provided that the periods of f1 and f2 are counted on past the synchronization time, the pairs can alternatively also fix longer time intervals directly. To be able to decouple the pairs in a defined manner, the two derived frequencies f1 and f2 should have a rigid coupling to the master clock as is given by PLLs.

Due to the two derived frequencies f1 and f2, a time base is thus available which is substantially finer than the sampling pattern. Either the actual transmission time can thus be delayed by multiples of the difference period with respect to a reference time or the one element of the pair defines the transmission time and the other the time for the start of the statistical recording of the received pattern in the histogram unit 42. There is thus a time offset between the transmission time and the reception time which is independent of the sampling pattern with the slow 2.5 ns. The time base unit 38 can work completely within the FPGA 18 and can therefore be implemented simply and is less prone to interference.

FIGS. 8 to 10 shows in a non-exclusive manner some sensors in which the measurement core 10 can be used. In this respect, the same reference numerals designate the same or analog features as in all Figures. In FIG. 8, a one-dimensional optoelectronic sensor 200 is shown in a very simplified manner, with the transmitter 12 being made as a light transmitter and the receiver 16 as a light receiver. Any desired laser light sources can be used inter alia as the light transmitters 12, for example edge emitters or VCELs (vertical cavity surface emitting lasers), and generally other light sources such as LEDs are also suitable provided they can generate signals sufficiently sharp in time. The receiver is accordingly shown as a photodiode 16, with the use of a PDS (position sensitive diode) or of an array or of a matrix of light receiving elements also being conceivable such as a CMOS chip, that is generally any receiver which can convert a light signal into an electric signal. The invention manages with simple light sources 12 and simple light receivers 16 due to the improved evaluation.

The light transmitter 12 only covers a small and insignificant portion of the light beam which is reflected at a reflector or at the target object 14 and which expands on its path. Alternatively, other known optical solutions can also be used such as autocollimation, for instance with a beam splitter and a common optical system, or pupil division where two separate optical systems are provided and the light transmitter and the light receiver are arranged next to one another.

The sensor 200 can be an optoelectronic sensor or a distance measuring device. In addition to an actual distance measurement, in which an absolute value is determined for a distance from an object 14, the monitoring of a taught distance, for example from a fixed cooperative target 14, for changes in the taught distance is also conceivable. A further embodiment is a reflection light barrier, that is a light barrier having a light transmitter and a reflector arranged opposite, with an interruption of the beam reflected there being detected. Monitoring can be done by the measurement of the distance or of the change in the distance of this reflector whether the reflector is still at the expected position. All the known sensors can output or display a distance value or can also work as a switch in that a switch event is triggered on detection of an object at a specific distance or on a deviation from an expected distance.

A plurality of sensors 200 can be combined to form a sensing light grid having a plurality of usually parallel beams which measures or monitors distances in each beam. Mobile systems are also conceivable in which the sensor 10 is movably installed.

A laser scanner 30 is shown with the measurement core 10 in FIG. 9. The light transmitter 12 and the light receiver 16 each have an optical system 40, 42 associated with them, with such optical systems usually also being provided in a one-dimensional sensor 300 in accordance with FIG. 8. The scanning beam of the light transmitter 12 is directed into the monitored zone via a first deflection unit 44 and via a second deflection unit 46. The deflection units 44, 46, which are made as mirrors, for example, are rotatably journalled so that the scanning beam is periodically conducted over a scan plane. In this respect, the rotatable unit with the deflection units 44, 46 is provided with an encoder so that the angular position is always known. The first deflection unit 44 only covers a negligibly small portion of the reflected scanning beam which is thus incident on the light receiver 16 almost completely after repeat deflection at the second deflection unit 46 and is evaluated in the measurement core 10 to determine the distance of the object 14. In this manner, the laser scanner 300 gains distance profiles in its scan plane with reference to the angular position and the distances. Differing structures of laser scanners are known, for example with a rotatable polygonal mirror wheel, which are likewise covered by the invention. The direct evaluation in accordance with the invention of the histograms by means of interpolation is fast enough to deliver measured values sufficiently fast during the fast scanning movement.

FIG. 10 shows a filling level scanner 400 in accordance with the TDR principle with the measurement core 10 which measures the distance from a boundary surface 48 of a medium 50 and thus the filling level of the medium 50 in a container 52. The transmitter 12 is made as a microwave transmitter here whose microwave pulse is conducted to the boundary surface 48 on a probe 54 and is reflected at least in part there due to the different dielectric constant of the surrounding medium 50. The receiver 16 is accordingly a microwave receiver and the reception time is determined in the measurement core 10. The probe 54 is a coaxial probe in FIG. 10. Other probe forms, for example, a mono-probe with only one conductor are known. Filling level measurements are also carried out in accordance with the radar principle without conduction on a probe 54. All such measurements are comprised by the invention.

The invention claimed is:

1. A sensor for the measurement of distances or of distance changes in accordance with the signal transit time principle having, comprising:
   a transmitter for the transmission of an electromagnetic signal;
   a transmission controller by means of which the signals can be transmitted by the transmitter at presettable transmission times;
   a receiver for the reception of the signal remitted in a monitored zone; and
   an evaluation unit of the sensor configured to:
      trigger the transmission of a plurality of individual signals at respective transmission times in a plurality of respective measurement periods and to sample a respective plurality of received signals,
      accumulate a histogram of the plurality of received signals over the plurality of measurement periods to determine the reception time from the histogram and the transit time from said reception time, wherein the reception time is determined by an interpolation of the histogram, and
      preset the presettable transmission times over the plurality of measurement periods in accordance with a distribution such that the time position of the reception time varies within the histogram over the plurality of measurement periods.

2. A sensor in accordance with claim 1, wherein the distribution is shallow or Gaussian and/or wherein the breadth of the distribution amounts to a multiple of the time resolution of the histogram.

3. A sensor in accordance with claim 1, wherein the interpolation takes place with reference to a function fit with an expected signal curve in an environment of the reception time, in particular by linear regression analysis.

4. A sensor in accordance with claim 1, wherein the evaluation unit is implemented on a digital logic module and wherein an analog preprocessor is provided via which the received signal can be converted to a bipolar preprocessed signal and can be supplied via an A/D converter, in particular via a binarizer, to the evaluation unit, wherein the preprocessor in particular has a band pass filter or a differentiator for the conversion of the initially bipolar received signal into a bipolar signal.

5. A sensor in accordance with claim 1, wherein the evaluation unit is made to recognize the reception time with reference to a zero crossing, an extreme or a point of inflection of a function interpolating the histogram.

6. A sensor in accordance with claim 1, wherein the evaluation unit is made to determine a plurality of reception times of part reflections and thus the distances of a plurality of objects disposed in the same direction.

7. A sensor in accordance claim 1, wherein an analog/digital converter for the sampling of the plurality of received signals to increase a sampling rate works with a plurality of clock pulse edges and/or phases, in particular for doubling with a plurality of rising and a plurality of falling clock pulse edges and/or phases or with a clock pulse phase shifted by 0° and a clock pulse phase shifted by 180° respectively, or for quadrupling with the rising and falling clock pulse edge of a respective clock pulse shifted by 0° and by 90° or with a respective clock pulse phase shifted by 0°, 90°, 180° and 270° in each case.

8. A sensor in accordance with claim 7, wherein the distribution is selected so that each histogram value is determined equally frequently under each phase shift and wherein the evaluation unit is made to bring the histogram values thus determined multiple times into time coincidence while compensating the phase shift.

9. A sensor in accordance with claim 1, wherein the evaluation unit is made only to use an environment of the reception time of the histogram as the basis for the interpolation, in particular only two, four or eight values of the histogram.

10. A sensor in accordance with claim 9, wherein the evaluation unit is made to locate the environment in that the histogram is folded with a correlation filter core, wherein the correlation filter core replicates the expected histogram development about the reception time.

11. A sensor in accordance with claim 1, which is made as an optoelectronic sensor, in particular as a light sensor or as a sensing light grid, wherein the electromagnetic signal is light, the transmitter is a light transmitter and the receiver is a light receiver and/or which is made as a distance-measuring laser scanner and which has a rotatable deflection unit to deflect the transmitted signal periodically over a sampling region and/or is made as a filling level sensor in accordance with the radar principle or the TDR principle, wherein the electromagnetic signal is a microwave signal, the transmitter is a microwave transmitter and the receiver is a microwave receiver.

12. A method for the measurement of distances or of distance changes in accordance with the signal transit time principle, comprising:
   transmitting an plurality of electromagnetic signals at presettable transmission times in a plurality of respective measurement periods;
   sampling a respective plurality of received signals after remission in a monitored zone;
   accumulating a histogram of the plurality of signals received from the sampling over the plurality of measurement periods; and
   determining a reception time from the histogram and the transit time is determined from said reception time,
   wherein the reception time is determined by an interpolation and thus with a better time resolution than that of the histogram; and
   the presettable transmission times are preset over the plurality of measurement periods in accordance with a distribution such that the time position of the reception time varies within the histogram over the plurality of measurement periods.

13. A method in accordance with claim 12, wherein the distribution is shallow or Gaussian; and/or wherein the interpolation takes place with reference to a function fit with an expected signal curve in the environment of the reception time, in particular by linear regression analysis.

14. A method in accordance with claim 12, wherein the sampling of the plurality of received signals takes place for the increasing of the sampling rate with a plurality of phases, in particular for doubling with a clock pulse phase-shifted by 0° and with a clock pulse shifted by 180° respectively or for quadrupling with a respective clock pulse phase shifted by 0°, 90°, 180° and 270°; and wherein the distribution is selected such that each histogram value is determined equally frequently under each phase shift, wherein the histogram values determined in this manner a multiple times are brought into coincidence in time while compensating the phase shift.

15. A method in accordance with claim 14, wherein only an environment of the reception time is used as the basis of the interpolation with a plurality of values of the histogram which correspond to a multiple of the factor by which the sampling rate is increased by the plurality of phases.

\* \* \* \* \*